(12) United States Patent
Goker et al.

(10) Patent No.: US 11,508,410 B2
(45) Date of Patent: Nov. 22, 2022

(54) MAGNETIC TAPE CARTRIDGE WITH INCREASED DATA STORAGE CAPACITY

(71) Applicant: Quantum Corporation, San Jose, CA (US)

(72) Inventors: Turguy Goker, Solana Beach, CA (US); George A. Saliba, Boulder, CO (US)

(73) Assignee: QUANTUM CORPORATION, San Jose, CA (US)

( * ) Notice: Subject to any disclaimer, the term of this patent is extended or adjusted under 35 U.S.C. 154(b) by 649 days.

(21) Appl. No.: 16/404,552

(22) Filed: May 6, 2019

(65) Prior Publication Data
US 2020/0357441 A1 Nov. 12, 2020

(51) Int. Cl.
G11B 23/04 (2006.01)

(52) U.S. Cl.
CPC .......... *G11B 23/048* (2013.01); *G11B 23/044* (2013.01)

(58) Field of Classification Search
CPC ............ B65H 2701/378; G11B 23/048; G11B 23/044; G11B 23/107; G11B 23/08728
See application file for complete search history.

(56) References Cited

U.S. PATENT DOCUMENTS

| | | | | |
|---|---|---|---|---|
| 4,196,873 A * | 4/1980 | Kudoh | ................... | G11B 15/67 242/332.5 |
| 5,284,308 A * | 2/1994 | Comeaux | ............. | G11B 15/605 360/96.1 |
| 5,803,388 A * | 9/1998 | Saliba | .............. | G11B 23/08728 242/348 |
| 6,040,966 A * | 3/2000 | Erickson | .......... | G11B 23/08728 242/345 |
| 6,047,921 A * | 4/2000 | Liepold | ................ | G11B 23/044 242/610.6 |
| 6,141,184 A * | 10/2000 | Daly | .................... | G11B 15/605 360/130.21 |
| 6,318,659 B1 * | 11/2001 | Zwettler | .............. | G11B 23/044 242/345 |
| 7,440,231 B2 | 10/2008 | Sachuk | | |
| 2003/0122015 A1 * | 7/2003 | Hiraguchi | ............ | G11B 23/107 242/348.2 |
| 2005/0077409 A1 * | 4/2005 | Brown | ................. | G11B 23/107 242/348 |
| 2005/0145736 A1 * | 7/2005 | Hiraguchi | ............ | G11B 23/043 242/338.1 |

(Continued)

*Primary Examiner* — Michael E Gallion
(74) *Attorney, Agent, or Firm* — Roeder & Broder LLP; James P. Broder

(57) ABSTRACT

A tape cartridge for retaining a magnetic tape, the tape cartridge being configured to be selectively positioned substantially within a tape drive, includes a cartridge body and a cartridge hub. The cartridge body includes a cartridge length from a front to a rear of the cartridge body, and a cartridge width from a first side to a second side of the cartridge body. The cartridge hub is positioned within the cartridge body. The cartridge hub is configured so that the magnetic tape is wound around the cartridge hub within the cartridge body. The cartridge hub includes a hub diameter. The cartridge length and the cartridge width provide boundaries for a maximum wound tape diameter as the magnetic tape is wound around the cartridge hub within the cartridge body. A ratio of the maximum wound tape diameter to the hub diameter is at least approximately 3.50:1.

21 Claims, 9 Drawing Sheets

(56) References Cited

U.S. PATENT DOCUMENTS

| | | | |
|---|---|---|---|
| 2007/0080254 A1* | 4/2007 | Shiga | G11B 15/674 242/348 |
| 2008/0223971 A1* | 9/2008 | Shiga | G11B 23/107 242/407 |
| 2008/0237382 A1* | 10/2008 | Shiga | G11B 23/107 242/324.2 |
| 2008/0265077 A1* | 10/2008 | Shiga | G11B 23/107 242/348.3 |
| 2008/0265078 A1* | 10/2008 | Shiga | G11B 23/107 242/348.3 |
| 2009/0045279 A1* | 2/2009 | Ishikawa | G11B 23/044 242/348 |
| 2011/0240786 A1* | 10/2011 | Takenoshita | G11B 23/113 242/348.3 |
| 2016/0284377 A1* | 9/2016 | Sumiya | G11B 23/107 |
| 2017/0316801 A1* | 11/2017 | Sumiya | G11B 5/78 |
| 2021/0125638 A1* | 4/2021 | Janssen | G11B 23/107 |

* cited by examiner

MAGNETIC TAPE CARTRIDGE WITH INCREASED DATA STORAGE CAPACITY

BACKGROUND

Magnetic tape cartridges are configured to retain and/or store magnetic tape that can be used in a magnetic tape drive for purposes of reading data from and writing data to the magnetic tape. During use of the magnetic tape drive, a tape head of the magnetic tape drive is configured to be in direct contact with the magnetic tape from the magnetic tape cartridge so that data can be written to and read from the magnetic tape as the magnetic tape moves across the tape head at high speed. It is desired to increase the amount of data that can be read from and/or written to any given magnetic tape cartridge. Accordingly, it is desired to increase the size of the recording tape area of the magnetic tape, e.g., the length and/or the width of the magnetic tape, that can be retained within a given magnetic tape cartridge.

FIG. 1A is a simplified schematic perspective view illustration of a prior art tape cartridge 10P. As shown, the prior art tape cartridge 10P is substantially rectangular box-shaped, including a front 12P, a rear 14P, a first side 16P, a second side 18P, a top 20P and a bottom 22P. Additionally, as shown, the prior art tape cartridge 10P has typical dimensions including a cartridge length 24P of approximately 102.00 millimeters measured from the front 12P to the rear 14P, a cartridge width 26P of approximately 105.00 millimeters measured from the first side 16P to the second side 18P, and a cartridge height 28P of approximately 21.50 millimeters measured from the top 20P to the bottom 22P.

FIG. 1B is a simplified schematic cutaway view illustration of the prior art tape cartridge 10P taken on line B-B in FIG. 1A. More specifically, FIG. 1B illustrates various structures and/or components included within the prior art tape cartridge 10P, as well as certain dimensions of such structures. Additionally, FIG. 1B further illustrates certain size restrictions for a tape length and a tape width of a magnetic tape 40P that can be retained within the prior art tape cartridge 10P due to the presence and size of such structures.

For example, as shown in FIG. 1B, the prior art tape cartridge 10P includes a cartridge body 30P that forms the exterior shell casing for the prior art tape cartridge 10P, a cartridge hub base 32P that is coupled to the cartridge body 30P, a cartridge hub 34P that is movably coupled to the cartridge hub base 32P, and a flange assembly 36P that is coupled to the cartridge hub 34P. Additionally, as shown, the flange assembly 36P includes a first flange arm 37P, a spaced apart second flange arm 38P, and a flange body 39P that is coupled to and extends between the first flange arm 37P and the second flange arm 38P and adjacent to the cartridge hub 34P. Further, the magnetic tape 40P is illustrated as being wound around the cartridge hub 34P (and/or a portion of the flange body 39P) and between the first flange arm 37P and the second flange arm 38P of the flange assembly 36P. More specifically, the first flange arm 37P and the second flange arm 38P function as an alignment guide or alignment assembly for the magnetic tape 40P such that the magnetic tape 40P is kept in a desired lateral position (i.e. with limited lateral movement relative to the cartridge height 28P (illustrated in FIG. 1A)) as it is wound (and unwound) around the cartridge hub 34P (and/or a portion of the flange body 39P) and between the first flange arm 37P and the second flange arm 38P of the flange assembly 36P. Thus, it is appreciated that the size of the magnetic tape 40P, i.e. the tape width and the tape length of the magnetic tape 40P, is constrained based on the dimensions and positioning of the cartridge body 30P, the cartridge hub 34P, and the flange assembly 36P.

As illustrated, the cartridge body 30P of the prior art tape cartridge 10P has a body thickness 42P of approximately 1.60 millimeters. Additionally, the cartridge hub 34P and the flange body 39P cooperate to define a hub diameter 44P, which is the minimum diameter at which the magnetic tape 40P is wound around the cartridge hub 34P (and/or a portion of the flange body 39P). In this embodiment, the hub diameter 44P around which the magnetic tape 40P is wound (and unwound) is approximately 44.00 millimeters. Further, a length of the flange arms 37P, 38P as they extend away from the flange body 39P enables a maximum wound tape diameter 46P of approximately 96.80 millimeters. Thus, as the magnetic tape 40P is wound (and unwound) around the cartridge hub 34P (and/or a portion of the flange body 39P), the magnetic tape 40P has an inner (minimum) diameter (i.e. hub diameter 44P or "minimum wound tape diameter") of approximately 44.00 millimeters, and an outer (maximum) diameter (i.e. the maximum wound tape diameter 46P) of approximately 96.80 millimeters. Stated in another manner, the ratio of the outer (maximum) diameter to the inner (minimum) diameter of the magnetic tape 40P usable within the prior art tape cartridge 10P is approximately 2.2:1. Assuming standard thickness of the magnetic tape 40P, such dimensions of the prior art tape cartridge 10P further enable the magnetic tape 40P to have a tape length of approximately 960.00 meters.

Still further, the flange assembly 36P of the prior art tape cartridge 10P has an arm spacing 48P between the first flange arm 37P and the second flange arm 38P of approximately 12.65 millimeters. Since the magnetic tape 40P is maintained and aligned between the flange arms 37P, the magnetic tape 40P can have a tape width 50P of less than approximately 12.65 millimeters. Thus, the prior art tape cartridge 10P and the magnetic tape 40P cooperate to provide a tape width ratio (i.e. the ratio of the tape width 50P to the cartridge height 28P) of less than approximately 0.59:1.

FIG. 1C is a simplified schematic sectional view of the prior art tape cartridge 10P and a portion of a prior art tape drive 52P that is configured to use the prior art tape cartridge 10P. In particular, FIG. 1C illustrates the operative connection between the prior art tape cartridge 10P and the prior art tape drive 52P when the prior art tape cartridge 10P is positioned substantially within the prior art tape drive 52P. As shown, the prior art tape cartridge 10P includes a resilient member 54P that selectively moves the cartridge hub 34P relative to the cartridge body 30P to enable a desired engagement between the prior art tape cartridge 10P and the prior art tape drive 52P. Additionally, as illustrated, the prior art tape drive 52P includes a cartridge reel motor 56P that engages the cartridge hub 34P and selectively rotates the cartridge hub 34P as desired to wind (and unwind) the magnetic tape 40P around the cartridge hub 34P (and/or a portion of the flange body 39P). More particularly, as shown, the prior art tape drive 52P includes a cartridge engaging member 77P that is configured to engage a drive engaging member 79P of the prior art tape cartridge 10P. As illustrated, the cartridge reel motor 56P is coupled to the cartridge engaging member 77P and selectively rotates the cartridge engaging member 77P. Additionally, the drive engaging member 79P is coupled to and/or integrally formed with the cartridge hub 34P. Thus, the selective rotation of the cartridge engaging member 77P results in the selective rotation of the drive engaging member 79P, and thus the cartridge hub 34P, due to the engagement between the cartridge engaging member 77P and the drive engaging member 79P. It is appreciated that the amount of movement of the cartridge hub 34P between FIG. 1B and FIG. 1C is exaggerated for purposes of illustration.

Further, FIG. 1C also illustrates that the prior art tape drive 52P can include a braking assembly 57P that is configured to selectively stop the motion of the cartridge reel motor 56P and/or the cartridge engaging member 77P, when it is desired to stop the rotation of the cartridge hub 34P, i.e. when it is desired to stop the winding or unwinding of the magnetic tape 40P about the cartridge hub 34P.

Additionally, it is appreciated that due to the design of the prior art tape cartridge 10P, i.e. with the movable cartridge hub 34P and/or the drive engaging member 79P that engages the cartridge reel motor 56P and/or the cartridge negating member 77P due to movement of the cartridge hub 34P from expansion of the resilient member 54P, the cartridge hub 34P must be of sufficient size to enable such functionality. More specifically, the cartridge hub 34P is configured to have a diameter of approximately 40.00 millimeters (and thus the combined hub diameter 44P along with a portion of the flange assembly 36P of approximately 44.00 millimeters) to accommodate such functionality.

Further, as shown, a ratio of a diameter of the drive engaging member 79P (and/or the cartridge engaging member 77P) to the hub diameter 44P in the prior art tape cartridge 10P is approximately 1:1.

SUMMARY

The present invention is directed toward a tape cartridge for retaining a magnetic tape, the tape cartridge being configured to be selectively positioned substantially within a tape drive. In various embodiments, the tape cartridge includes a cartridge body and a cartridge hub. The cartridge body includes a cartridge length from a front to a rear of the cartridge body, and a cartridge width from a first side to a second side of the cartridge body. The cartridge hub is positioned within the cartridge body. The cartridge hub is configured so that the magnetic tape is wound around the cartridge hub within the cartridge body. The cartridge hub includes a hub diameter. The cartridge length and the cartridge width provide boundaries for a maximum wound tape diameter as the magnetic tape is wound around the cartridge hub within the cartridge body. In one embodiment, a ratio of the maximum wound tape diameter to the hub diameter is at least approximately 3.50:1. In some embodiments, the ratio of the maximum wound tape diameter to the hub diameter is at least approximately 4.00:1. In still other embodiments, the ratio of the maximum wound tape diameter to the hub diameter is at least approximately 4.50:1.

Additionally, in certain embodiments, the cartridge hub is fixed in position relative to the cartridge body. In some such embodiments, the tape cartridge further includes a drive engaging member that is coupled to the cartridge hub. Additionally, in such embodiments, the tape drive can include a cartridge engaging member that selectively engages the drive engaging member, and a cartridge reel motor that rotates the cartridge engaging member, the drive engaging member and the cartridge hub as the magnetic tape is wound around the cartridge hub. The tape drive can also include a resilient member that moves the cartridge engaging member so that the cartridge engaging member engages the drive engaging member. Further, in certain such embodiments, the drive engaging member has a diameter that is greater than the hub diameter.

In some embodiments, the tape cartridge further includes an alignment assembly that is coupled to the cartridge body, the alignment assembly including an alignment roller that is in contact with an outer surface of the magnetic tape as the magnetic tape is wound around the cartridge hub. The alignment assembly can also include a resilient member that is coupled to the alignment roller, the resilient member providing a biasing force such that the alignment roller is always in contact with the outer surface of the magnetic tape as the magnetic tape is wound around the cartridge hub.

Additionally, in certain embodiment, the cartridge body further includes a cartridge height from a top to a bottom of the cartridge body; wherein the magnetic tape has a tape width; and wherein a tape width ratio of the tape width to the cartridge height is at least approximately 0.65:1.

Further, in some embodiments, the cartridge body has a body thickness of less than approximately 1.25 millimeters.

Still further, in certain embodiments, the tape cartridge is an LTO compatible tape cartridge. More particularly, in such embodiments, the tape cartridge is usable within a tape drive that operates in compliance with an LTO specification, while enabling an increased recording tape area for the magnetic tape despite the magnetic tape being of a standard tape thickness.

Additionally, the present invention is further directed toward a tape cartridge for retaining a magnetic tape, the tape cartridge being configured to be selectively positioned substantially within a tape drive, the tape cartridge including a cartridge body including a cartridge height from a top to a bottom of the cartridge body; and a cartridge hub that is positioned within the cartridge body, the cartridge hub being configured so that the magnetic tape is wound around the cartridge hub within the cartridge body; wherein the magnetic tape has a tape width; and wherein a tape width ratio of the tape width to the cartridge height is at least approximately 0.65:1.

Further, the present invention is also directed toward a tape cartridge for retaining a magnetic tape, the tape cartridge being configured to be selectively positioned substantially within a tape drive, the tape cartridge including a cartridge body including a cartridge length from a front to a rear of the cartridge body, a cartridge width from a first side to a second side of the cartridge body, and a cartridge height from a top to a bottom of the cartridge body; a cartridge hub that is positioned within the cartridge body, the cartridge hub being configured so that the magnetic tape is wound around the cartridge hub within the cartridge body, the cartridge hub including a hub diameter; and an alignment assembly that is coupled to the cartridge body, the alignment assembly including an alignment roller and a resilient member that is coupled to the alignment roller, the resilient member providing a biasing force such that the alignment roller is always in contact with an outer surface of the magnetic tape as the magnetic tape is wound around the cartridge hub; wherein the cartridge length and the cartridge width provide boundaries for a maximum wound tape diameter as the magnetic tape is wound around the cartridge hub within the cartridge body; wherein a ratio of the maximum wound tape diameter to the hub diameter is at least approximately 4.50:1; wherein the magnetic tape has a tape width; and wherein a tape width ratio of the tape width to the cartridge height is at least approximately 0.75:1.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Embodiments of the present invention are described herein in the context of a magnetic tape cartridge (also sometimes referred to herein simply as a "tape cartridge") that has increased data storage capacity in comparison to standard prior art tape cartridges. More specifically, embodiments of the tape cartridge of the present invention are configured to minimize and/or remove certain structures of the tape cartridge, and/or add alternative components, to enable a magnetic tape of increased size, e.g., increased tape length and/or increased tape width, to be effectively retained within the tape cartridge.

Additionally, as provided herein, in some embodiments, the tape cartridge of the present invention is compatible with tape drives that operate in compliance with an LTO specification. Thus, in such embodiments, the tape cartridge can also be referred to as an "LTO compatible tape cartridge". Further, or in the alternative, in other embodiments, the tape drive may require certain modifications in specifications in order to be compatible with the tape cartridge of the present invention.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 2:
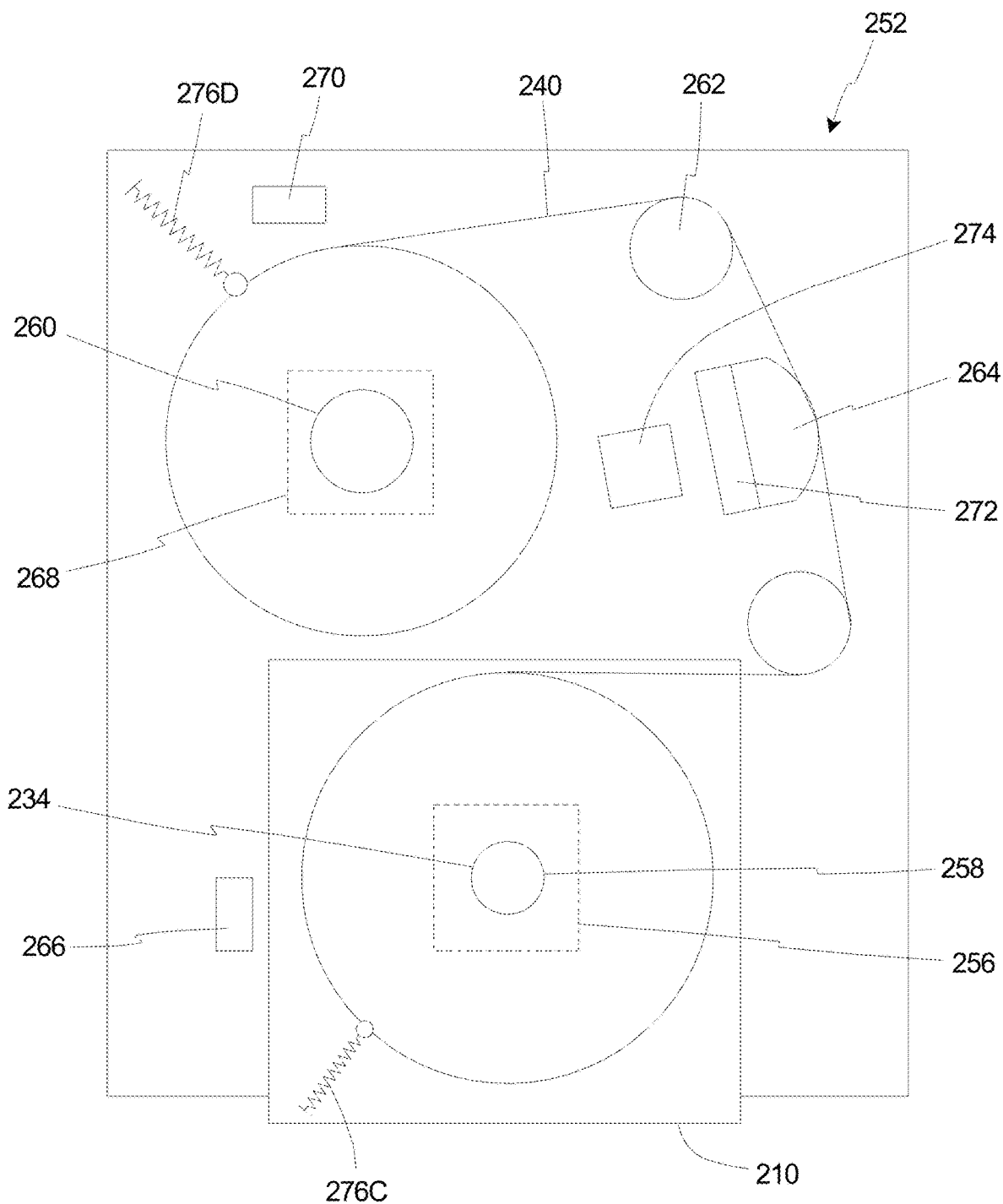
FIG. 2 is a simplified schematic top view illustration of a tape drive, and an embodiment of a tape cartridge having features of the present invention that has been inserted into the tape drive.

FIG. 2 is a simplified schematic top view illustration of a magnetic tape drive 252 (also referred to herein simply as a "tape drive"), and an embodiment of a magnetic tape cartridge 210 (also referred to herein as a "tape cartridge") having features of the present invention that has been inserted into the tape drive 252. It is appreciated that the tape drive 252 as shown in FIG. 2 represents a generic tape drive, and is shown by way of example and not by way of limitation. In some embodiments, the tape drive 252 operates in compliance with an LTO specification, such as LTO-6, LTO-7 or LTO-8. Stated in another manner, in such embodiments, the tape cartridge 210 is an LTO compatible tape cartridge.

During use of the tape drive 252, the tape cartridge 210 is inserted into the tape drive 252 to read data from and/or write data to the tape cartridge 210. As shown, the tape cartridge 210 includes a cartridge reel 258 that includes and/or defines a cartridge hub 234. A magnetic tape 240 is spooled about the cartridge hub 234 of the cartridge reel 258. In certain embodiments, the magnetic tape 240 can include at least one servo track (not shown) and a plurality of data tracks (not shown) that run along a longitudinal length of the magnetic tape 240. Additionally, each of these tracks can be positioned substantially parallel to each other.

The tape cartridge 210 supplies the magnetic tape 240 to the tape drive 252. More particularly, when the tape cartridge 210 is inserted into the tape drive 252, one end of the magnetic tape 240 is taken up within the tape drive 252 to be wrapped around a drive reel 260 included in the tape drive 252. The magnetic tape 240 traverses a predefined path between the cartridge reel 258 and the drive reel 260, which is defined, a least in part, by one or more rollers 262 (two are shown in FIG. 2) positioned at strategic positions along the predefined path. The rollers 262 may also aid in limiting gross lateral movement (i.e. in and out of the page as shown in FIG. 2) of the magnetic tape 240, i.e. lateral tape motion or "LTM".

Along the predefined path, the drive reel 260 moves the magnetic tape 240 across a head 264, e.g., a read/write head, that is configured to read data from and/or write data to the magnetic tape 240. In particular, the head 264 is positioned in close proximity to the predefined path of the magnetic tape 240 such that as the magnetic tape 240 travels in the longitudinal direction (by being wound from the cartridge reel 258 to the drive reel 260 or vice versa) the head 264 can read/write data to a particular track and longitudinal position of the magnetic tape 240. Additionally, the head 264 can include one or more servo elements configured to read the servo track(s) of the magnetic tape 240.

In some embodiments, as shown, the tape drive 252 can also include a cartridge reel motor 256 (illustrated as a box in phantom) that generates the necessary force to rotate the cartridge reel 258 at will, and a cartridge reel encoder 266, e.g., a sensor or detector, that is configured to output signals representing the pulse rate (or rotation rate) of the cartridge reel motor 256. Additionally, the tape drive 252 can further include a drive reel motor 268 (illustrated as a box in phantom) that generates the necessary force to rotate the drive reel 260 at will, and a drive reel encoder 270, e.g., a sensor or detector, that is configured to output signals representing the pulse rate (or rotation rate) of the drive reel motor 268.

As illustrated in this embodiment, the tape drive 252 also includes an actuator 272 and a controller 274 that can be communicatively coupled to the head 264. The actuator 272 is configured to control the lateral position of the head 264 relative to the magnetic tape 240 based on a signal provided by the controller 274. As such, the actuator 272 comprises a mechanical positioner to move the head 264 up or down laterally. By controlling the lateral position of the head 264 relative to the magnetic tape 240, a particular track of the magnetic tape 240 can be accessed as desired.

The controller 274 is in communication with the actuator 272 and a number of other components within the tape drive 252. For example, although not specifically shown in FIG. 2, each of the cartridge reel motor 256, the cartridge reel encoder 266, the drive reel motor 268, and the drive reel encoder 270 can be in communication with the controller 274. As such, the controller 274 can be configured to perform various specified operations, either individually, or in combination with other software, hardware and/or firmware elements.

Additionally, or in the alternative, in some embodiments, the tape drive 252 can include additional heads and associated actuators so that more than one track of the magnetic tape 240 can be read from and/or written to simultaneously. For example, the servo track may have a dedicated head and the data tracks may use a separate head. Further, the head 264 may comprise two discrete components, i.e. one head for read operations and another head for write operations.

Still further, FIG. 2 also illustrates that the tape cartridge 210 includes a cartridge reel alignment assembly 276C (also referred to herein simply as an "alignment assembly") for the magnetic tape 240 such that the magnetic tape 240 is kept in a desired lateral position (i.e. with limited lateral movement) as it is wound (and unwound) around the cartridge hub 234. Thus, the alignment assembly 276C can be helpful for higher track density applications. It is appreciated that in certain embodiments, the alignment assembly 276C can also be configured to minimize air entrainment that may otherwise occur during the winding and unwinding of the magnetic tape 240 around the cartridge hub 234. It is further appreciated that the inclusion of the alignment assembly 276C within the tape cartridge 210 can further improve cartridge manufacturing, where air entrainment may otherwise occur during the initial winding of the magnetic tape 240 if not for the presence of the alignment assembly 276C. Thus, yields during the manufacturing process can be improved as additional time to address air entrainment during the initial winding process is no longer required due to the presence of the alignment assembly 276C. Embodiments of the alignment assembly 276C will be described in greater detail herein below.

Yet further, in some embodiments, as shown in FIG. 2, the tape drive 252 can also be modified to include a drive reel alignment assembly 276D for the magnetic tape 240 such that the magnetic tape 240 is kept in a desired lateral position as it is wound (and unwound) around the drive reel 260. It is appreciated that in certain embodiments, the drive reel alignment assembly 276D can also be configured to minimize air entrainment that may otherwise occur during the winding and unwinding of the magnetic tape 240 around the drive reel 260. It is further appreciated that the general design and functioning of the drive reel alignment assembly 276D can be substantially similar to that of the cartridge reel alignment assembly 276C.

Figure 1A:
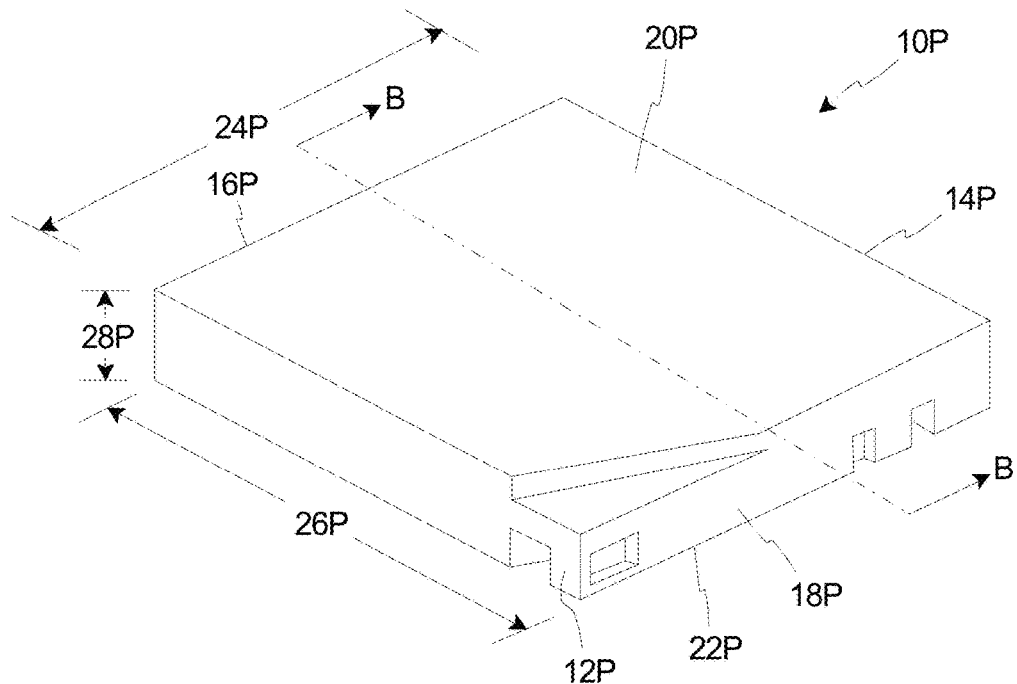
FIG. 1A is a simplified schematic perspective view illustration of a prior art tape cartridge.
Figure 3A:
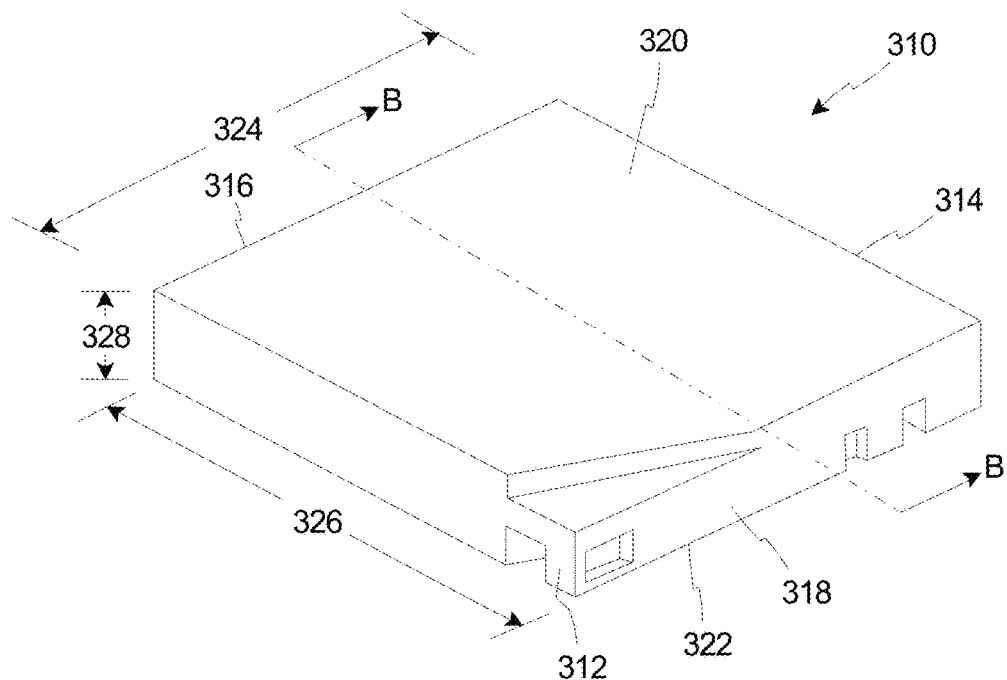
FIG. 3A is a simplified schematic perspective view illustration of an embodiment of the tape cartridge.

FIG. 3A is a simplified schematic perspective view illustration of an embodiment of the tape cartridge 310. As illustrated, the tape cartridge 310 can have an overall size and shape that is substantially similar to that of the prior art tape cartridge 10P illustrated and described above in relation to FIG. 1A. More particularly, the tape cartridge 310 can have a size and shape that is suitable for use within a standard tape drive. For example, as shown, the tape cartridge 310 is substantially rectangular box-shaped, including a front 312, a rear 314, a first side 316, a second side 318, a top 320, and a bottom 322. Additionally, as shown, the tape cartridge 310 has dimensions including a cartridge length 324 of approximately 102.00 millimeters measured from the front 312 to the rear 314, a cartridge width 326 of approximately 105.00 millimeters measured from the first side 316 to the second side 318, and a cartridge height 328 of approximately 21.50 millimeters measured from the top 320 to the bottom 322. Alternatively, the tape cartridge 310 can have a different shape and/or have different dimensions than those specifically noted herein.

Figure 3B:
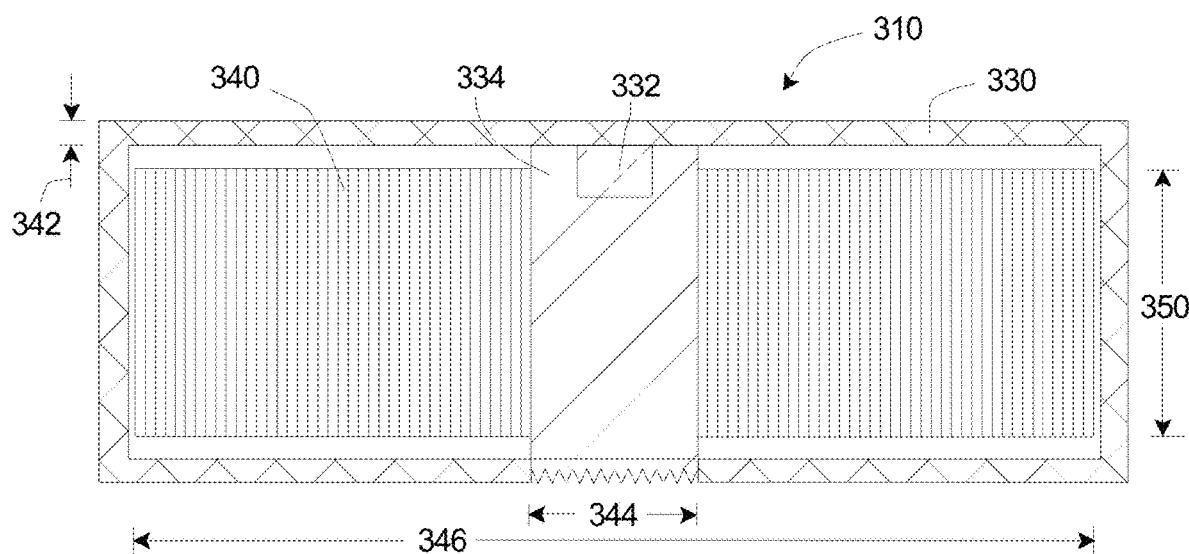
FIG. 3B is a simplified schematic cutaway view illustration of the tape cartridge taken on line B-B in FIG. 3A.

FIG. 3B is a simplified schematic cutaway view illustration of the tape cartridge 310 taken on line B-B in FIG. 3A. More specifically, FIG. 3B illustrates various structures and/or components included within the tape cartridge 310, as well as certain dimensions of such structures. Additionally, FIG. 3B further illustrates certain size possibilities for a tape length and a tape width of a magnetic tape 340 that can be retained within the tape cartridge 310 due to the presence and size of such structures.

As provided herein, the changes to the structure of the tape cartridge 310 in comparison to the prior art tape cartridge 10P enable the use of a magnetic tape 340 having a tape length and/or a tape width that are substantially greater than what is possible with the prior art tape cartridge 10P. Thus, the desire to increase the amount of data that can be read from and/or written to any given magnetic tape cartridge, by increasing the size of the magnetic tape, e.g., the length and/or the width of the magnetic tape, that can be retained within a given magnetic tape cartridge, can be achieved through use of the tape cartridge 310 of the present invention. As such, the recording tape area of the magnetic tape 340 can be greatly increased even when using magnetic tape of a standard tape thickness.

For example, as shown in FIG. 3B, the tape cartridge 310 includes a cartridge body 330 that forms the exterior shell casing for the tape cartridge 310, a cartridge hub base 332 that is coupled to the cartridge body 330, and a cartridge hub 334 that is movably, e.g., rotatably, coupled to the cartridge hub base 332. Importantly, as described in detail herein, the tape cartridge 310 is configured to enable the cartridge hub 334 to be much smaller than in the prior art tape cartridge 10P. With a smaller cartridge hub 334 and a similar overall sized cartridge body 330, it is appreciated that the tape cartridge 310 can provide a suitable housing for a magnetic tape 340 of increased tape length in comparison to what is possible in the prior art tape cartridge 10P. Additionally, the tape cartridge 310 is further designed without the need for the flange assembly, thus further expanding the size possibilities for the magnetic tape 340, e.g., the tape width of the magnetic tape 340, within the tape cartridge 310.

Further, as shown in FIG. 3B, a magnetic tape 340 is illustrated as being wound around the cartridge hub 334. As illustrated and described herein below, in some embodiments, the tape cartridge can further include an alignment assembly 276C (illustrated in FIG. 2) for the magnetic tape 340 such that the magnetic tape 340 is kept in a desired lateral position (i.e. with limited lateral movement relative to the cartridge height 328 (illustrated in FIG. 3A)) as it is wound (and unwound) around the cartridge hub 334. Additionally, as noted herein, the alignment assembly 276C is further configured to minimize air entrainment that may otherwise occur during the winding and unwinding of the magnetic tape 340 around the cartridge hub 334. Thus, it is appreciated that the size of the magnetic tape 340, i.e. the tape width and the tape length of the magnetic tape 340, can be greatly increased in comparison to the prior art tape cartridge 10P based on the configuration, dimensions and positioning of the cartridge body 330, the cartridge hub 334, and the alignment assembly 276C.

In some embodiments, the cartridge body 330 of the tape cartridge 310 has a body thickness 342 of between approximately 0.90 millimeters and 1.25 millimeters. More particularly, in one non-exclusive alternative embodiment, the cartridge body 330 can have a body thickness 342 of approximately 1.00 millimeters. Alternatively, the cartridge body 330 can have a body thickness 342 of greater than approximately 1.25 millimeters or less than approximately 0.90 millimeters.

Additionally, as shown, the cartridge hub 334 has a hub diameter 344, which is the minimum diameter at which the magnetic tape 340 is wound around the cartridge hub 334. In certain embodiments, the cartridge hub 334 has a hub diameter 344 of between approximately 5.00 millimeters and 35.00 millimeters. More particularly, in one non-exclusive alternative embodiment, the cartridge hub 334 has a hub diameter 344 of approximately 20.00 millimeters. Alternatively, the tape cartridge 310 can be configured such that the cartridge hub 334 has a hub diameter 344 that is greater than approximately 35.00 millimeters or less than approximately 5.00 millimeters. In this embodiment, where the magnetic tape 340 is wound (and unwound) directly around the cartridge hub 334, the hub diameter 344 can also be referred to as an "inner (minimum) diameter" or "minimum wound tape diameter" for the magnetic tape 340.

Figure 1B:
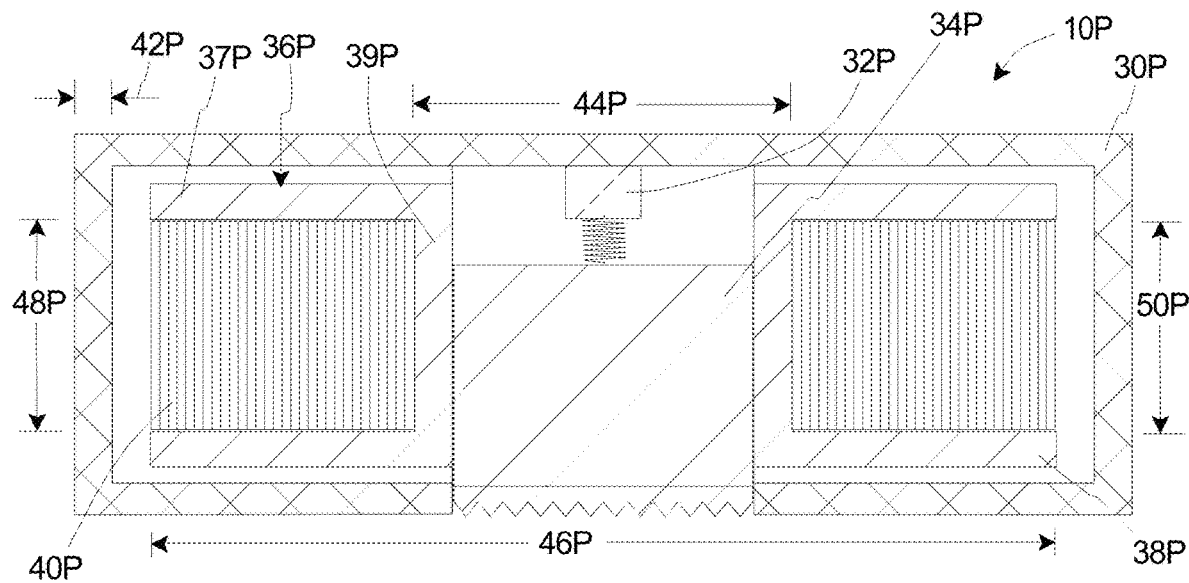
FIG. 1B is a simplified schematic cutaway view illustration of the prior art tape cartridge taken on line B-B in FIG. 1A.

Thus, as illustrated, the tape cartridge 310 is configured to have a cartridge hub 334 with a hub diameter 344 that is smaller than in the prior art tape cartridge 10P (illustrated in FIG. 1B). It is appreciated that the smaller hub diameter 344 can be accomplished in any suitable manner. For example, in some embodiments, the cartridge hub 334 can be substantially annular-shaped, and the smaller hub diameter 344 can be accomplished by decreasing the size of any components positioned within the annular-shaped cartridge hub 334, by decreasing a thickness of a body of the annular-shaped cartridge hub 334, and/or by simply decreasing an outer diameter of the annular-shaped cartridge hub 334. Alternatively, in another embodiments, the cartridge hub 334 can be substantially cylindrical-shaped, and the smaller hub diameter 344 can be accomplished by simply decreasing the size of the cylinder. Still alternatively, the smaller hub diameter 344 for the cartridge hub 334 can be accomplished in another suitable manner.

Further, in some embodiments, the design of the tape cartridge 310, e.g., with a smaller body thickness 342 than the prior art tape cartridge 10P and no flange assembly, enables a maximum wound tape diameter 346 of between approximately 97.50 millimeters and 100.00 millimeters. More particularly, in one non-exclusive alternative embodiment, the tape cartridge 310 has a maximum wound tape diameter 346 of approximately 99.00 millimeters. Alternatively, in other embodiments, the tape cartridge 310 can have a maximum wound tape diameter 346 of greater than approximately 100.00 millimeters or less than approximately 97.50 millimeters. It is appreciated that the maximum wound tape diameter 346 can also be referred to herein as an "outer (maximum) diameter" for the magnetic tape 340.

As noted above, with the prior art tape cartridge 10P, the ratio of the outer (maximum) diameter to the inner (minimum) diameter of the magnetic tape 40P usable within the prior art tape cartridge 10P is approximately 2.2:1. In contrast, in certain embodiments, the ratio of the inner (minimum) diameter (i.e. hub diameter 344 or "minimum wound tape diameter") to the outer (maximum) diameter (i.e. maximum wound tape diameter 346) for the magnetic tape 340 usable with the tape cartridge 310 illustrated and described herein can be between approximately 2.50:1 and 6.00:1. In some such non-exclusive embodiments, the ratio of the inner (minimum) diameter (i.e. hub diameter 344) to the outer (maximum) diameter (i.e. wound tape diameter 346) for the magnetic tape 340 usable with the tape cartridge 310 can be approximately 2.50:1, 2.75:1, 3.00:1, 3.25:1, 3.50:1, 3.75:1, 4.00:1, 4.25:1, 4.50:1, 4.75:1, 5.00:1, 5.25:1, 5.50:1, 5.75:1 or 6.00:1. More particularly, in one non-exclusive alternative embodiment, as the magnetic tape 340 is wound (and unwound) around the cartridge hub 334, the magnetic tape 340 has an inner (minimum) diameter (i.e. hub diameter 344) of approximately 20.00 millimeters, and an outer (maximum) diameter (i.e. wound tape diameter 346 of approximately 99.00 millimeters. Stated in another manner, in such embodiment, the ratio of the outer (maximum) diameter to the inner (minimum) diameter of the magnetic tape 340 usable within the tape cartridge 310 is approximately 4.95:1. Assuming standard thickness of the magnetic tape 340, such dimensions of the tape cartridge 310 further enable the magnetic tape 340 to have a tape length of approximately 1276.00 meters. Alternatively, in other embodiments, the ratio of the inner (minimum) diameter (i.e. hub diameter 344) to the outer (maximum) diameter (i.e. wound tape diameter 346) for the magnetic tape 340 usable with the tape cartridge 310 can be greater than approximately 6.00:1 or less than approximately 2.50:1.

Still further, as described in greater detail herein below, in some embodiments, the alignment assembly 276 enables the magnetic tape 340 to have a tape width 350 of between 13.50 millimeters and 18.00 millimeters. More particularly, in one non-exclusive alternative embodiment, the alignment assembly 276 enables the magnetic tape 340 to have a tape width 350 of approximately 16.50 millimeters. Alternatively, in other embodiments, the magnetic tape 340 can have a tape width 350 of greater than approximately 18.00 millimeters or less than approximately 13.50 millimeters.

Thus, assuming a tape cartridge 310 having a standard cartridge height 328 of approximately 21.50 millimeters, in certain embodiments, the tape cartridge 310 and the magnetic tape 340 cooperate to provide a tape width ratio (i.e. the ratio of the tape width 350 to the cartridge height 328) of between approximately 0.65:1 and 0.85:1. More particularly, in certain such non-exclusive embodiments, the tape cartridge 310 and the magnetic tape 340 cooperate to provide a tape width ratio of approximately 0.65:1, 0.67:1, 0.70:1, 0.72:1, 0.75:1, 0.77:1, 0.80:1, 0.82:1 or 0.85:1.

Alternatively, in other embodiments, the tape cartridge 310 and the magnetic tape 340 can cooperate to provide a tape width ratio of greater than approximately 0.85:1 or less than approximately 0.65:1.

Figure 3C:
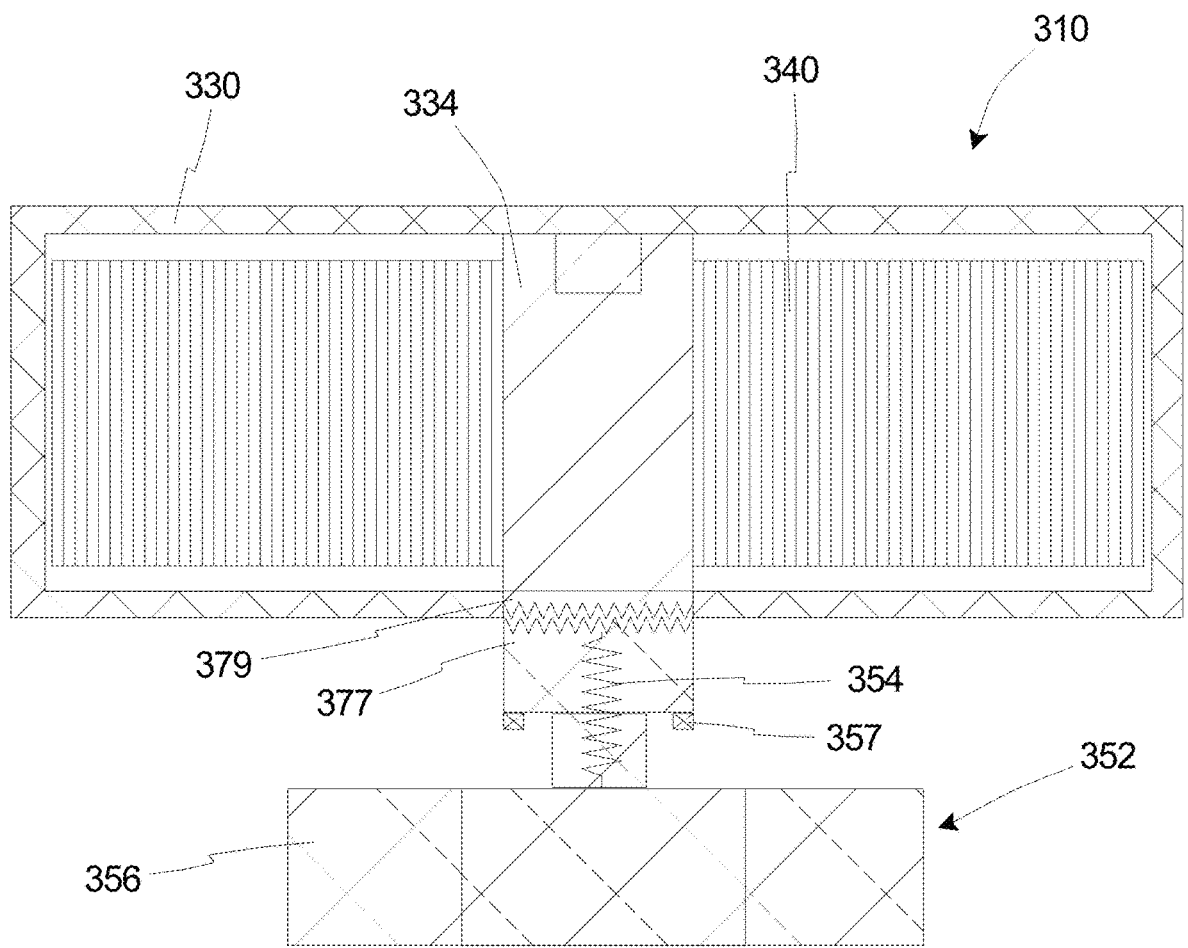
FIG. 3C is a simplified schematic sectional view of the tape cartridge illustrated in FIG. 3A and a portion of an embodiment of the tape drive.

FIG. 3C is a simplified schematic sectional view of the tape cartridge 310 illustrated in FIG. 3A and a portion of the tape drive 352 that is configured to use the tape cartridge 310. In particular, FIG. 3C illustrates the operative connection between the tape cartridge 310 and the tape drive 352 when the tape cartridge 310 is positioned substantially within the tape drive 352. As shown in this embodiment, the cartridge hub 334 is fixed in position relative to the cartridge body 330, and the tape drive 352 includes a resilient member 354 that selectively moves a cartridge engaging member 377 of the tape drive 352 to enable a desired engagement between the tape cartridge 310 and the tape drive 352. More particularly, as illustrated, the resilient member 354 can be configured to automatically move the cartridge engaging member 377 of the tape drive 352 toward the tape cartridge 310, i.e. toward a drive engaging member 379 of the tape cartridge 310 that is coupled to the cartridge hub 334, when the tape cartridge 310 is positioned substantially within the tape drive 352, such that the cartridge engaging member 377 effectively engages the drive engaging member 379.

Additionally, as shown, the tape drive 352 further includes a cartridge reel motor 356 that selectively rotates the cartridge engaging member 377, which, in turn, selectively rotates the drive engaging member 379 and thus the cartridge hub 334 as desired due to the engagement between the cartridge engaging member 377 and the drive engaging member 379 (i.e. which is coupled to the cartridge hub 334). The rotation of the cartridge hub 334 thus causes the magnetic tape 340 to be selectively would (and unwound) around the cartridge hub 334 as desired.

FIG. 3C also illustrates that the tape drive 352 can include a braking assembly 357 that is configured to selectively stop the motion of the cartridge reel motor 356 and/or the cartridge engaging member 377, when it is desired to stop the rotation of the cartridge hub 334, i.e. when it is desired to stop the winding or unwinding of the magnetic tape 340 about the cartridge hub 334. It is appreciated that the braking assembly 357 can be positioned in any suitable manner to selectively stop the motion of the cartridge reel motor 356 and/or the cartridge engaging member 377.

Further, it is appreciated that due to the design of the tape cartridge 310, i.e. with the cartridge hub 334 being fixed in position through engagement with the cartridge engaging member 377 of the tape drive 352, and with the resilient member 354 being included within the tape drive 352 rather than within the tape cartridge 310, the cartridge hub 334 can be of a much smaller diameter than in the prior art tape cartridge 10P.

Moreover, as shown in this embodiment, a ratio of a diameter of the drive engaging member 379 (and/or the cartridge engaging member 377) to the hub diameter 344 in the tape cartridge 310 is approximately 1.0:1.0. However, as illustrated, in comparison to the prior art tape cartridge 10P and the prior art tape drive 52P, the diameter of the drive engaging member 379 (and/or the cartridge engaging member 377), and the hub diameter 344, are all much smaller.

Thus, as described in detail herein, the configuration of various embodiments of the tape cartridge 310 enable the use of a magnetic tape 340 having a tape width 350 (illustrated in FIG. 3B) and a tape length that can be substantially greater than what is possible within the prior art tape cartridge 10P.

It is appreciated that the increased tape width 350 for the magnetic tape 340 is made possible due to the presence of the alignment assembly 276 (illustrated in FIG. 2) that is configured for purposes of maintaining the desired lateral position of the magnetic tape 340 and minimizing air entrainment during winding and unwinding of the magnetic tape 340 around the cartridge hub 334. Certain embodiments of the alignment assembly are illustrated and described herein in relation to FIG. 4 and FIG. 5.

Figure 3D:
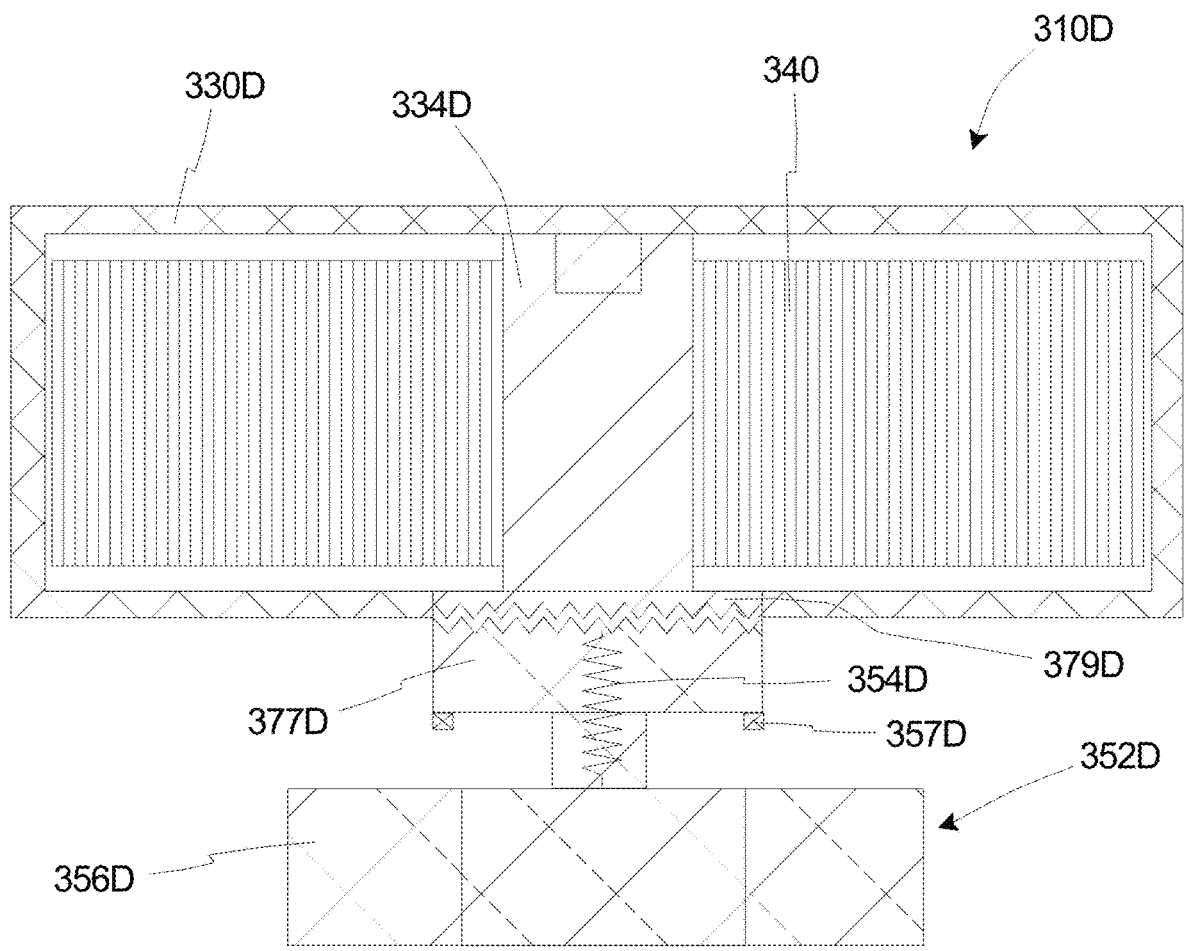
FIG. 3D is a simplified schematic sectional view of another embodiment of the tape cartridge and a portion of another embodiment of the tape drive.

FIG. 3D is a simplified schematic sectional view of another embodiment of the tape cartridge 310D and a portion of another embodiment of the tape drive 352D that is configured to use the tape cartridge 310D. In particular, FIG. 3D illustrates the operative connection between the tape cartridge 310D and the tape drive 352D when the tape cartridge 310D is positioned substantially within the tape drive 352D. As shown, the operative connection between the tape cartridge 310D and the tape drive 352D is substantially similar to the operative connection between the tape cartridge 310 and the tape drive 352 as shown in FIG. 3C. However, in this embodiment, the sizes of certain components are different than what was shown and described in FIG. 3C.

As above, in this embodiment, the cartridge hub 334D is again fixed in position relative to the cartridge body 330D. Additionally, the tape drive 352D again includes a resilient member 354D that selectively moves a cartridge engaging member 377D of the tape drive 352D to enable a desired engagement between the tape cartridge 310D and the tape drive 352D. Further, in this embodiment, the tape cartridge 310D again includes a drive engaging member 379D that is configured to be selectively engaged by the cartridge engaging member 377D. However, in this embodiment, the drive engaging member 379D (and/or the cartridge engaging member 377D) has a diameter that is larger than the hub diameter 344 (illustrated in FIG. 3B). In certain non-exclusive embodiments, a ratio of the diameter of the drive engaging member 379D (and/or the cartridge engaging member 377D) to the hub diameter 344 can be between approximately 1.50:1 and 4.50:1. For example, in such embodiments, the ratio of the diameter of the drive engaging member 379D (and/or the cartridge engaging member 377D) to the hub diameter 344 can be approximately 1.50:1, 1.75:1, 2.00:1, 2.25:1, 2.50:1, 2.75:1, 3.00:1, 3.25:1, 3.50:1, 3.75:1, 4.00:1, 4.25:1 or 4.50:1. Alternatively, the ratio of the diameter of the drive engaging member 379D (and/or the cartridge engaging member 377D) to the hub diameter 344 can be greater than approximately 4.50:1 or less than approximately 1.50:1.

Figure 1C:
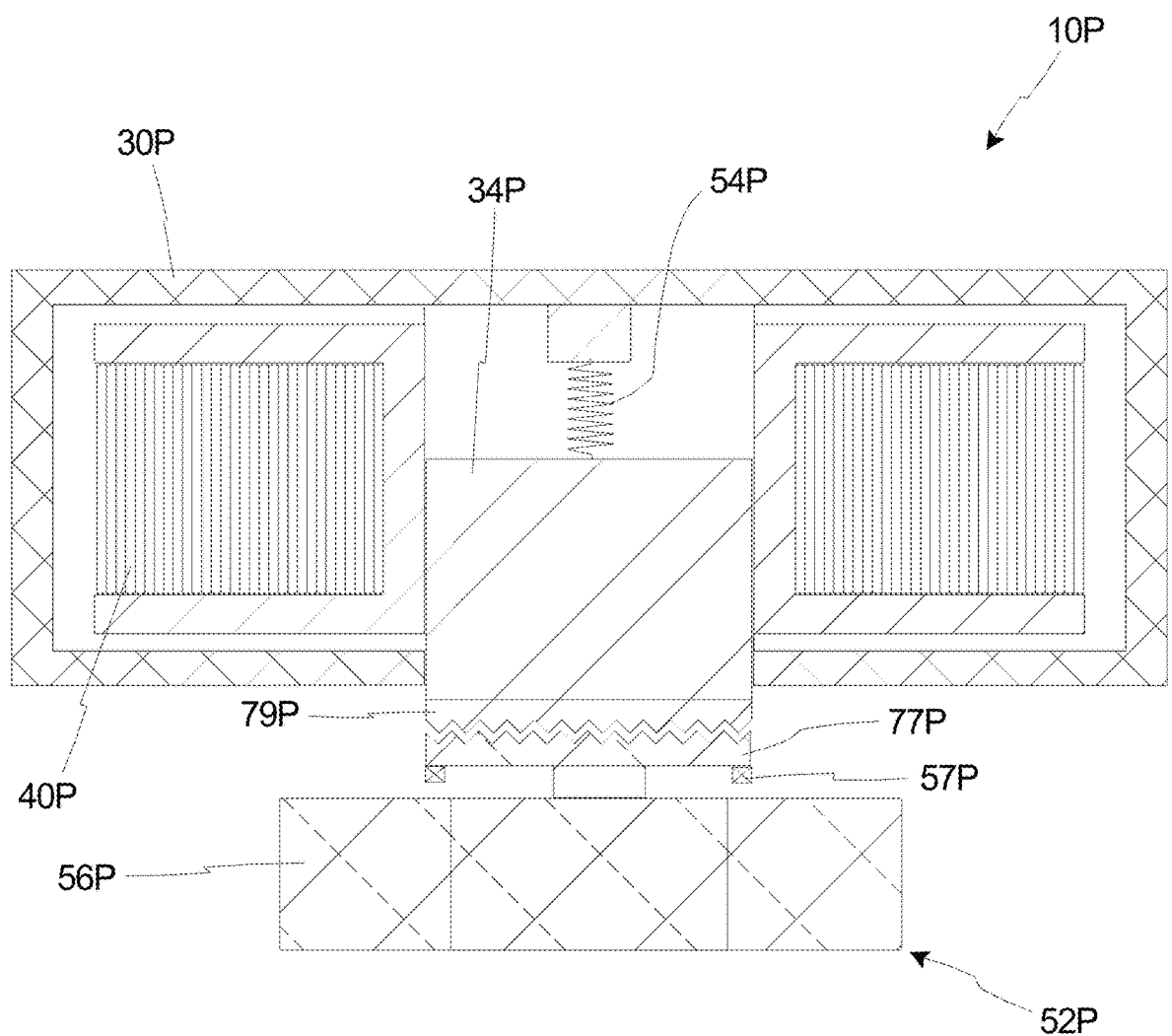
FIG. 1C is a simplified schematic sectional view of the prior art tape cartridge and a portion of a tape drive.

More particularly, in one embodiment, the drive engaging member 379D has a diameter that is substantially similar to what is shown in the prior art tape cartridge 10P (illustrated in FIG. 1C). With such design, the cartridge engaging member 377D of the tape drive 352 can be of a similar diameter, which is also substantially similar to what is shown in the prior art tape drive 52P (illustrated in FIG. 1C). As such, the tape cartridge 310D is more directly compatible with a standard tape drive design, i.e. with fewer, if any, modifications required from the standard tape drive.

Additionally, as shown, the tape drive 352D again includes a cartridge reel motor 356D that selectively rotates the cartridge engaging member 377D, which, in turn, selectively rotates the drive engaging member 379D and the cartridge hub 334D as desired due to the engagement between the cartridge engaging member 377 and the drive engaging member 379D. The rotation of the cartridge hub 334D thus causes the magnetic tape 340 to be selectively wound (and unwound) around the cartridge hub 334D as desired.

Further, FIG. 3D also illustrates that the tape drive 352D can include a braking assembly 357D that is configured to selectively stop the motion of the cartridge reel motor 356D and/or the cartridge engaging member 377D, when it is desired to stop the rotation of the cartridge hub 334D, i.e. when it is desired to stop the winding or unwinding of the magnetic tape 340 about the cartridge hub 334D.

Figure 3E:
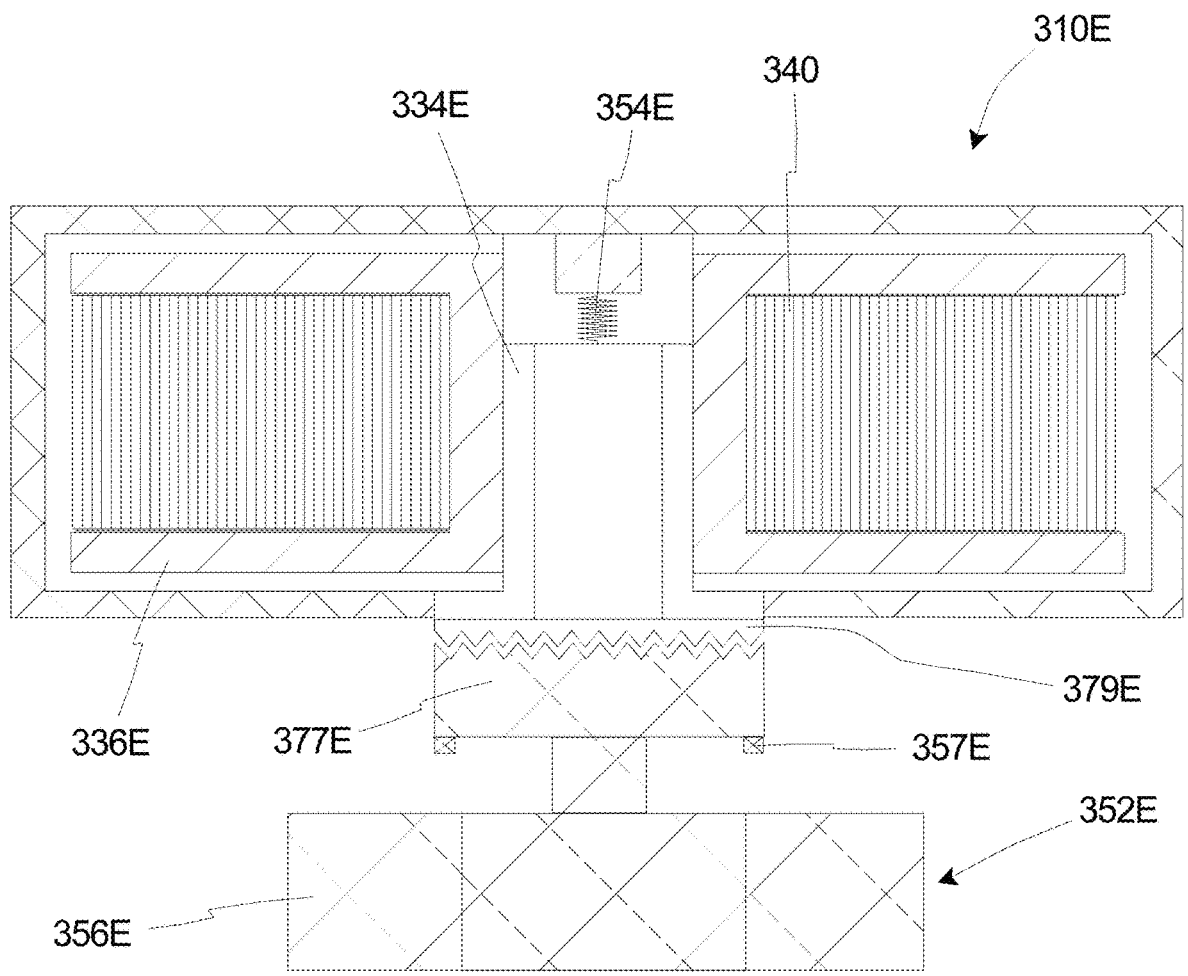
FIG. 3E is a simplified schematic sectional view of still another embodiment of the tape cartridge and a portion of still another embodiment of the tape drive.

FIG. 3E is a simplified schematic sectional view of still another embodiment of the tape cartridge 310E and a portion of still another embodiment of the tape drive 352E that is configured to use the tape cartridge 310E. In particular, FIG. 3E illustrates the operative connection between the tape cartridge 310E and the tape drive 352E when the tape cartridge 310E is positioned substantially within the tape drive 352E. As shown, the operative connection between the tape cartridge 310E and the tape drive 352E is substantially similar to the operative connection between the tape cartridge 310, 310D and the tape drive 352, 352D as shown in FIGS. 3C and 3D. However, in this embodiment, the sizes and inclusion of certain components are different than what was shown and described in FIGS. 3C and 3D.

For example, in this embodiment, the tape cartridge 310E includes certain features or structures that were included in the prior art tape cartridge 10P. In particular, as shown in FIG. 3E, the tape cartridge 310E includes a resilient member 354E that is configured to selectively move the cartridge hub 334E to enable a desired engagement between the drive engaging member 379E that is coupled to the cartridge hub 334E and the cartridge engaging member 377E that is coupled to the cartridge reel motor 356E of the tape drive 352E. Thus, in this embodiment, the cartridge hub 334E is again selectively movable relative to the tape drive 352E, i.e. when the tape cartridge 310E is positioned substantially within the tape drive 352E, in a manner substantially similar to what was illustrated and described in relation to the prior art tape cartridge 10P.

Additionally, as shown in this embodiment, the tape cartridge again includes a flange assembly 336E that is positioned substantially adjacent to the cartridge hub 334E and that is configured to function as an alignment guide for the magnetic tape 340 such that the magnetic tape 340 is kept in a desired lateral position as it is wound (and unwound) around the cartridge hub 334E.

Thus, in the embodiment illustrated in FIG. 3E, the tape cartridge 310E is somewhat similar to the prior art tape cartridge 10P, except that the cartridge hub 334E again includes a hub diameter 344 (illustrated in FIG. 3B) that is similar in size to the embodiments shown in FIGS. 3C and 3D, i.e. the hub diameter 344 is much smaller than in the prior art tape cartridge 10P. It is appreciated that to enable such a smaller hub diameter 344, it can be necessary and/or desired that any components positioned within the cartridge hub 334E, e.g., the resilient member 354E, be smaller in size in comparison to what is shown in the prior art tape cartridge 10P. Moreover, similar to the embodiment shown in FIG. 3D, the drive engaging member 379E (and/or the cartridge engaging member 377E) again has a diameter that is larger than the hub diameter 344. In certain non-exclusive embodiments, a ratio of the diameter of the drive engaging member 379E (and/or the cartridge engaging member 377E) to the hub diameter 344 can be between approximately 1.50:1 and 4.50:1. For example, in such embodiments, the ratio of the diameter of the drive engaging member 379E (and/or the cartridge engaging member 377E) to the hub diameter 344 can be approximately 1.50:1, 1.75:1, 2.00:1, 2.25:1, 2.50:1, 2.75:1, 3.00:1, 3.25:1, 3.50:1, 3.75:1, 4.00:1, 4.25:1 or 4.50:1. Alternatively, the ratio of the diameter of the drive engaging member 379E (and/or the cartridge engaging member 377E) to the hub diameter 344 can be greater than approximately 4.50:1 or less than approximately 1.50:1.

Additionally, as with the previous embodiments, the cartridge reel motor 356E of the tape drive 352E is again configured to selectively rotate the cartridge engaging member 377E, which, in turn, selectively rotates the drive engaging member 379E and the cartridge hub 334E as desired due to the engagement between the cartridge engaging member 377E and the drive engaging member 379E. The rotation of the cartridge hub 334E thus causes the magnetic tape 340 to be selectively wound (and unwound) around the cartridge hub 334E as desired. Further, FIG. 3E also illustrates that the tape drive 352E can include a braking assembly 357E that is configured to selectively stop the motion of the cartridge reel motor 356E and/or the cartridge engaging member 377E, when it is desired to stop the rotation of the cartridge hub 334E, i.e. when it is desired to stop the winding or unwinding of the magnetic tape 340 about the cartridge hub 334E.

Figure 4:
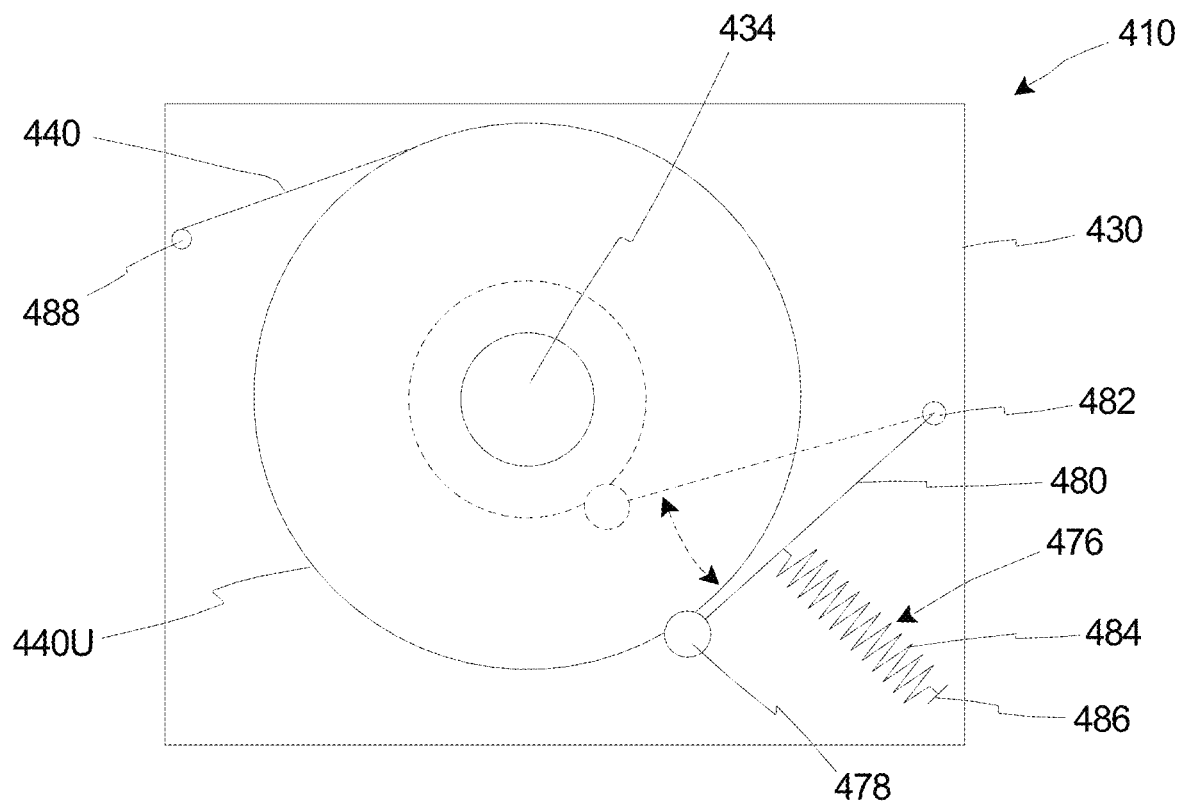
FIG. 4 is a simplified schematic top view illustration of a portion of yet another embodiment of the tape cartridge.

FIG. 4 is a simplified schematic top view illustration of a portion of another embodiment of the tape cartridge 410, and a magnetic tape 440 that can be retained within the tape cartridge 410. More particularly, FIG. 4 illustrates that the tape cartridge 410 includes a cartridge body 430, a cartridge hub 434, and an embodiment of the alignment assembly 476.

As noted herein, the alignment assembly 476 is configured to guide the magnetic tape 440 such that the magnetic tape 440 is kept in a desired lateral position (i.e. with limited lateral movement) as it is wound (and unwound) around the cartridge hub 434. Additionally, as noted, the alignment assembly 476 is further configured to minimize air entrainment that may otherwise occur during the winding and unwinding of the magnetic tape 440 around the cartridge hub 434. It is appreciated that the inclusion of the alignment assembly 476 enables the tape cartridge 410 to be designed without the need for a flange assembly 36P (illustrated in FIG. 1B) such as is used within the prior art tape cartridge 10P (illustrated in FIG. 1A). Additionally, it is further appreciated that the use of the alignment assembly 476 rather than the flange assembly 36P enables the tape cartridge 410 to provide a housing for the magnetic tape 440 having a greater tape width 350 (illustrated in FIG. 3B) than what is possible within the prior art tape cartridge 10P.

The design of the alignment assembly 476 can be varied. As shown in the embodiment illustrated in FIG. 4, the alignment assembly 476 includes an alignment roller 478, a roller arm 480, an arm pivot 482, a resilient member 484 and a member base 486. Additionally, or in the alternative, the alignment assembly 476 can include more components or fewer components than what is specifically illustrated in FIG. 4.

The alignment roller 478 is positioned to push against an outer surface 440U of the magnetic tape 440 at all times during the winding and unwinding of the magnetic tape 440 around the cartridge hub 434. More particularly, as illustrated, the alignment roller 478 is selectively movable between a first position (illustrated in solid lines) and a second position (illustrated in dashed lines) depending on the amount of the magnetic tape 440 that is wound around the cartridge hub 434 at any given time. It is appreciated that the first position and the second position can be any positions along a continuum from the maximum wound tape diameter to the minimum wound tape diameter.

The roller arm 480 is coupled to the alignment roller 478 such that movement of the roller arm 480 provides corresponding movement of the alignment roller 478. For example, during movement of the alignment roller 478 between the first position and the second position, the roller arm 480 pivots about the arm pivot 482.

The resilient member 484 is coupled to the roller arm 480 and provides a force against the roller arm 480 so that the alignment roller 478 will always remain in contact with the outer surface 440U of the magnetic tape 440 as the magnetic tape 440 is wound and unwound around the cartridge hub 434. Stated in another manner, the resilient member 484 provides a biasing force against the roller arm 480 to pivot the roller arm 480 as necessary about the arm pivot 482 so that the alignment roller 478 will always remain in contact with the outer surface 440U of the magnetic tape 440 as the magnetic tape 440 is wound and unwound around the cartridge hub 434. Additionally, the constant force against the outer surface 440U of the magnetic tape 440 will help to minimize air entrainment, such as noted above.

As shown in this embodiment, the resilient member 484 is coupled to the cartridge body 430, e.g., substantially directly coupled to the cartridge body 430. More particularly, the resilient member 484 is coupled to the cartridge body 430 via the member base 486. With the end of the resilient member 484 coupled to the member base 486 being fixed in position through such coupling, the resilient member 484 is more effectively able to provide the desired biasing force onto the alignment roller 478 to maintain the alignment roller 478 is constant contact with the outer surface 440U of the magnetic tape 440.

It is appreciated that the various components of the alignment assembly 476 can be formed from any suitable materials.

Additionally, as also shown in FIG. 4, the tape cartridge 410 can further include an alignment pin 488 that is configured to guide movement of the magnetic tape 440 into and out of the tape cartridge 410 when the tape cartridge 410 is positioned substantially within the tape drive 252 (illustrated in FIG. 2).

Figure 5:
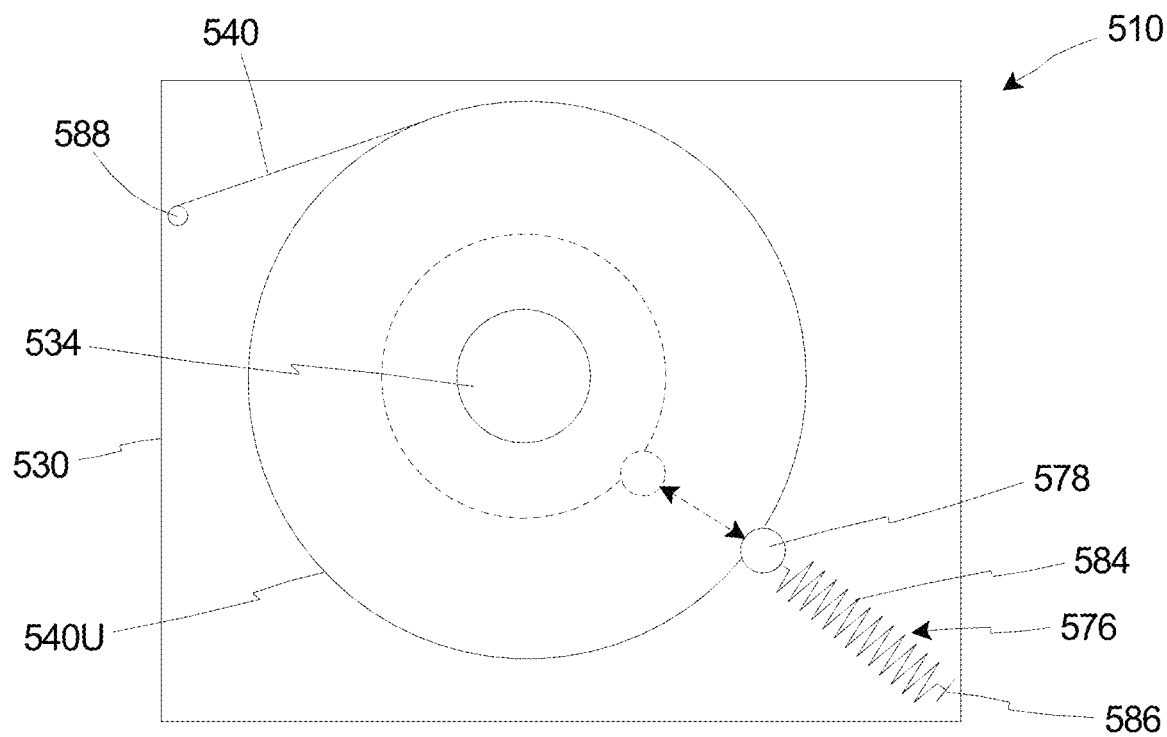
FIG. 5 is a simplified schematic top view illustration of still another embodiment of the tape cartridge.

FIG. 5 is a simplified schematic top view illustration of a portion of still another embodiment of the tape cartridge 510, and a magnetic tape 540 that can be retained within the tape cartridge 510. More particularly, FIG. 5 illustrates that the tape cartridge 510 includes a cartridge body 530, a cartridge hub 534, and another embodiment of the alignment assembly 576.

The alignment assembly 576 in this embodiment is somewhat similar in general design and function to the alignment assembly 476 illustrated and described in relation to FIG. 4. However, in this embodiment, the alignment assembly 576 is configured so as not to include the roller arm 480 and the arm pivot 482 that were included in the previous embodiment. More specifically, as illustrated in the embodiment shown in FIG. 5, the alignment assembly 576 includes an alignment roller 578, a resilient member 584 and a member base 586.

As with the previous embodiment, the alignment roller 578 is positioned to push against an outer surface 540U of the magnetic tape 540 at all times during the winding and unwinding of the magnetic tape 540 around the cartridge hub 534. More particularly, as illustrated, the alignment roller 578 is selectively movable between a first position (illustrated in solid lines) and a second position (illustrated in dashed lines) depending on the amount of the magnetic tape 540 that is wound around the cartridge hub 534 at any given time. It is appreciated that the first position and the second position can be any positions along a continuum from the maximum wound tape diameter to the minimum wound tape diameter.

Additionally, in this embodiment, the resilient member 484 is directly coupled to and provides a biasing force against the alignment roller 578 so that the alignment roller 578 will always remain in contact with the outer surface 540U of the magnetic tape 540 as the magnetic tape 540 is wound and unwound around the cartridge hub 534. Additionally, the constant force against the outer surface 540U of the magnetic tape 540 will help to minimize air entrainment, such as noted above.

As shown in this embodiment, the resilient member 584 is coupled to the cartridge body 530, e.g., substantially directly coupled to the cartridge body 530. More particularly, the resilient member 584 is coupled to the cartridge body 530 via the member base 586. With the end of the resilient member 584 coupled to the member base 586 being fixed in position through such coupling, the resilient member 584 is more effectively able to provide the desired biasing force onto the alignment roller 578 to maintain the alignment roller 578 is constant contact with the outer surface 540U of the magnetic tape 540.

Additionally, as also shown in FIG. 5, the tape cartridge 510 can further include an alignment pin 588 that is configured to guide movement of the magnetic tape 540 into and out of the tape cartridge 510 when the tape cartridge 510 is positioned substantially within the tape drive 252 (illustrated in FIG. 2).

Figure 6:
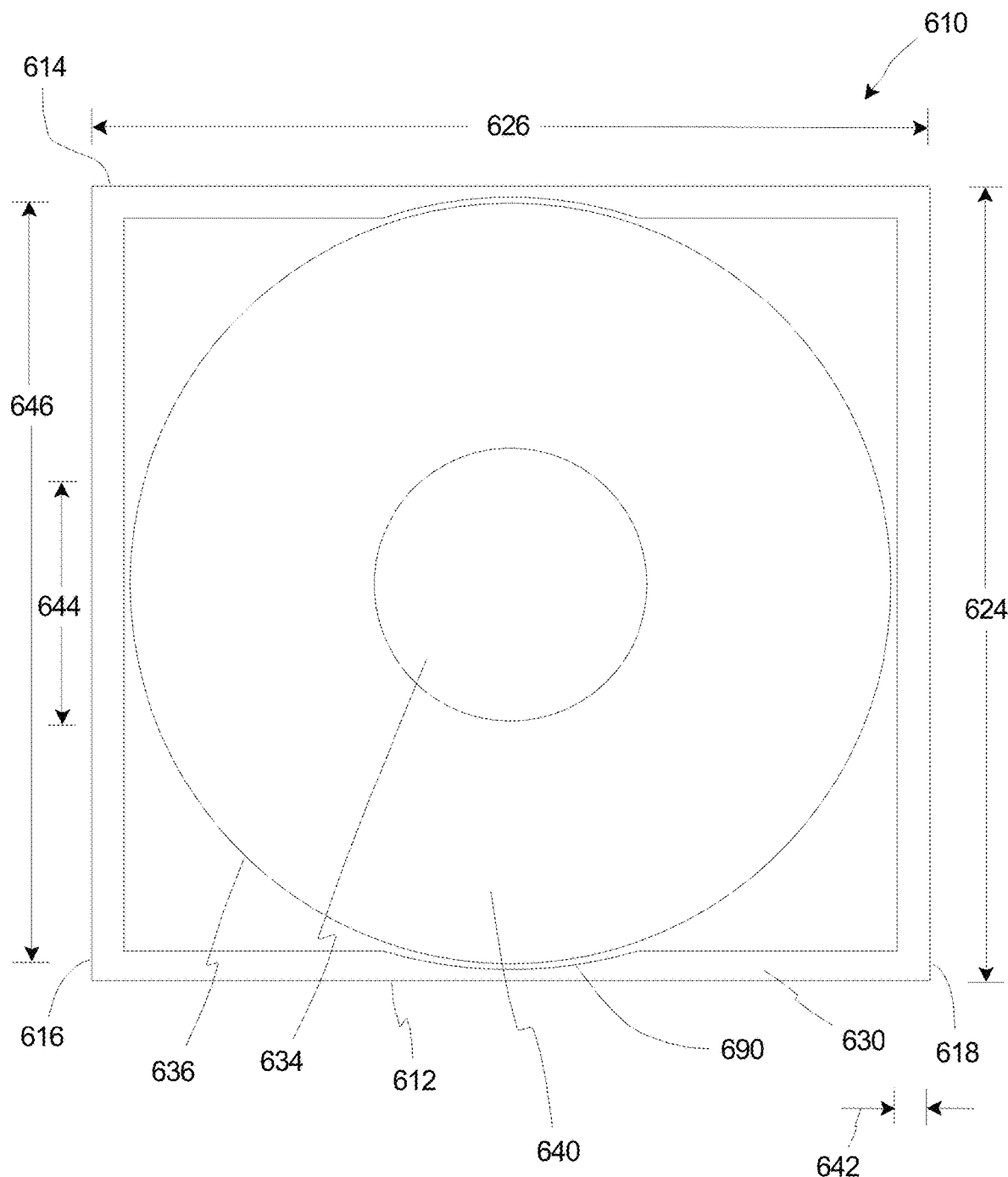
FIG. 6 is a simplified schematic top view illustration of still yet another embodiment of the tape cartridge.

FIG. 6 is a simplified schematic top view illustration of a portion of still yet another embodiment of the tape cartridge 610, and a magnetic tape 640 that can be retained within the tape cartridge 610. In particular, as shown in FIG. 6, the tape cartridge 610 is somewhat similar to what was illustrated and described above in relation to the prior art tape cartridge 10P of FIGS. 1A-1C. However, in this embodiment, changes have been made to the cartridge body 630 in order to enable the tape cartridge 610 to accommodate the magnetic tape 640 having a tape length that is somewhat greater than what was possible within the prior art tape cartridge 10P.

More specifically, as shown in FIG. 6, the tape cartridge 610 is again substantially rectangular box-shaped, including a front 612, a rear 614, a first side 616 and a second side 618. The top and the bottom are not shown in FIG. 6. Additionally, as shown, the tape cartridge 610 again has typical overall dimensions including a cartridge length 614 of approximately 102.00 millimeters measured from the front 612 to the rear 614, and a cartridge width 626 of approximately 105.00 millimeters measured from the first side 616 to the second side 618.

Additionally, the tape cartridge 610 again includes the cartridge body 630 that forms the exterior shell casing for the tape cartridge 610, a cartridge hub 634, and a flange assembly 636 that is coupled to the cartridge hub 634. As with the prior art tape cartridge 10P, the cartridge hub 634 and a portion of the flange assembly 636 cooperate to define a hub diameter 644, which is the minimum wound tape diameter at which the magnetic tape 640 is wound around the cartridge hub 634 (and/or a portion of the flange assembly 636). In this embodiment, the hub diameter (or minimum wound tape diameter) around which the magnetic tape 640 is wound (and unwound) can be approximately 44.00 millimeters.

As above, the flange assembly 636 is configured to function as an alignment guide or alignment assembly for the magnetic tape 640 such that the magnetic tape 640 is kept in a desired lateral position (i.e. with limited lateral movement) as it is wound (and unwound) around the cartridge hub 634 (and/or a portion of the flange assembly 636).

However, as illustrated in FIG. 6, modifications have been made to the cartridge body 630 to enable the flange assembly 636 to have an outer diameter that is somewhat greater than was possible within the prior art tape cartridge 10P. More specifically, as shown, cutout sections 690 (or recessed sections) have been formed into the cartridge body 630, i.e. into the front 612 and the rear 614 of the cartridge body 630, to enable the flange assembly 636 to have a larger outer diameter. In one embodiment, the cutout sections 690 can be substantially arc-shaped to accommodate the generally circular shape of the flange assembly 636, with fairly tight tolerances. Alternatively, the cutout sections 690 can have another suitable shape, provided that the cutout sections 690 still accommodate the desired larger outer diameter of the flange assembly 636. In such embodiments, it is appreciated that the cutout sections 690 still be relatively small so as to not adversely impact the overall structural integrity of the cartridge body 630, e.g., by having the overall body thickness 642 not be too small in the areas of the cutout sections 690.

In certain embodiments, the cutout sections 690 being formed into the cartridge body 630 enable the flange assembly 636 to have an outer diameter of approximately 101.00 millimeters. Thus, with such design, the magnetic tape 640 can have a maximum wound tape diameter 646 of approximately 101.00 millimeters as the magnetic tape 640 is wound (and unwound) around the cartridge hub 634 (and/or a portion of the flange assembly 636). Accordingly, in such embodiments, the ratio of the maximum wound tape diameter 646 to the minimum wound tape diameter 644 of the magnetic tape 640 usable within the tape cartridge 610 is approximately 2.3:1.

Additionally, assuming a standard thickness of the magnetic tape 640 of approximately 5.70 microns, each millimeter of diameter increase allows an additional 175 wraps of the magnetic tape 640. Accordingly, with a maximum wound tape diameter 646 of approximately 101.00 millimeters (as compared to the maximum wound tape diameter 46P for the prior art tape cartridge 10P of approximately 96.80 millimeters), the magnetic tape 640 can have a tape length that is approximately 55.00 meters longer than that of the prior art magnetic tape 40P. Stated in another manner, the cutout portions 690 in the cartridge body 630 enable the use of the magnetic tape 640 having a tape length of approximately 1015.00 meters, as compared to the prior art magnetic tape 40P which has a tape length of approximately 960.00 meters.

Further, in some embodiments, the tape cartridge 610 can also include one or more cylindrical guides (not shown), e.g., three cylindrical guides, that are coupled to the cartridge body 630, e.g., inserted into holes formed into the cartridge body 630. In such embodiments, the cylindrical guides can be used to center the tape drive 252 (illustrated in FIG. 2) relative to the cartridge hub 634 of the tape cartridge 610 so that any potential wobble of the tape cartridge 610 is inhibited as the tape cartridge 610 is being driven.

As provided in detail herein, embodiments of the tape cartridge 310, 310D, 410, 510, 610 demonstrate various differences in structures and/or sizes of structures that may exist in comparison to the prior art tape cartridge 10P. However, it is appreciated that any such changes to structures and/or sizes of structures can be implemented individually to provide certain benefits relative to the prior art tape cartridge 10P. More particularly, each of (i) the smaller body thickness 342, (ii) the smaller hub diameter 344, (iii) the inclusion of the cartridge reel alignment assembly 276C, (iv) the inclusion of the drive reel alignment assembly 276D, (v) the adjustment of the means of engagement between the tape cartridge 310 and the tape drive 352 (e.g., by changing what components are fixed in position and what components are movable to create the desired engagement), (vi) the removal of the flange assembly 36P, and (vii) the cutout sections 690 (or recessed sections) that are formed into the cartridge body 630, can be implemented individually or in any suitable combination with any of the other changes in comparison to the prior art tape cartridge 10P.

It is understood that although a number of different embodiments of the tape cartridge 310 have been illustrated and described herein, one or more features of any one embodiment can be combined with one or more features of one or more of the other embodiments, provided that such combination satisfies the intent of the present invention.

While a number of exemplary aspects and embodiments of the tape cartridge 310 have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A tape cartridge for retaining a magnetic tape, the tape cartridge being configured to be selectively positioned substantially within a tape drive, the tape cartridge comprising:
   a cartridge body including a cartridge length from a front to a rear of the cartridge body, and a cartridge width from a first side to a second side of the cartridge body; and
   a cartridge hub that is positioned within the cartridge body, the cartridge hub being configured so that the magnetic tape is wound around the cartridge hub within the cartridge body, the cartridge hub including a hub diameter;
   wherein the cartridge length and the cartridge width provide boundaries for a maximum wound tape diameter as the magnetic tape is wound around the cartridge hub within the cartridge body; and
   wherein a ratio of the maximum wound tape diameter to the hub diameter is at least approximately 3.50:1.

2. The tape cartridge of claim 1 wherein the ratio of the maximum wound tape diameter to the hub diameter is at least approximately 4.50:1.

3. The tape cartridge of claim 1 wherein the cartridge hub is fixed in position relative to the cartridge body.

4. The tape cartridge of claim 3 further comprising a drive engaging member that is coupled to the cartridge hub; and wherein the tape drive includes a cartridge engaging member that selectively engages the drive engaging member, a cartridge reel motor that rotates the cartridge engaging member, the drive engaging member and the cartridge hub as the magnetic tape is wound around the cartridge hub, and a resilient member that moves the cartridge engaging member so that the cartridge engaging member engages the drive engaging member.

5. The tape cartridge of claim 4 wherein the drive engaging member has a diameter that is greater than the hub diameter.

6. The tape cartridge of claim 1 further comprising a drive engaging member that is coupled to the cartridge hub; wherein the tape drive includes a cartridge engaging member that selectively engages the drive engaging member, and a cartridge reel motor that rotates the cartridge engaging member, the drive engaging member and the cartridge hub as the magnetic tape is wound around the cartridge hub; and wherein the drive engaging member has a diameter that is greater than the hub diameter.

7. The tape cartridge of claim 1 further comprising an alignment assembly that is coupled to the cartridge body, the alignment assembly including an alignment roller that is in contact with an outer surface of the magnetic tape as the magnetic tape is wound around the cartridge hub.

8. The tape cartridge of claim 7 wherein the alignment assembly further includes a resilient member that is coupled to the alignment roller, the resilient member providing a biasing force such that the alignment roller is always in contact with the outer surface of the magnetic tape as the magnetic tape is wound around the cartridge hub.

9. The tape cartridge of claim 1 wherein the cartridge body further includes a cartridge height from a top to a bottom of the cartridge body; wherein the magnetic tape has a tape width; and wherein a tape width ratio of the tape width to the cartridge height is at least approximately 0.65:1.

10. The tape cartridge of claim 9 further comprising an alignment assembly that is coupled to the cartridge body, the alignment assembly including an alignment roller that is in contact with an outer surface of the magnetic tape as the magnetic tape is wound around the cartridge hub.

11. The tape cartridge of claim 1 wherein the cartridge body has a body thickness of less than approximately 1.25 millimeters.

12. The tape cartridge of claim 1 wherein the tape cartridge is an LTO compatible tape cartridge.

13. A tape cartridge for retaining a magnetic tape, the tape cartridge being configured to be selectively positioned substantially within a tape drive, the tape cartridge comprising:
  a cartridge body including a cartridge height from a top to a bottom of the cartridge body; and
  a cartridge hub that is positioned within the cartridge body, the cartridge hub being configured so that the magnetic tape is wound around the cartridge hub within the cartridge body;
  wherein the magnetic tape has a tape width; and
  wherein a tape width ratio of the tape width to the cartridge height is at least approximately 0.65:1.

14. The tape cartridge of claim 13 wherein the tape width ratio of the tape width to the cartridge height is at least approximately 0.75:1.

15. The tape cartridge of claim 13 wherein the cartridge hub is fixed in position relative to the cartridge body.

16. The tape cartridge of claim 15 further comprising a drive engaging member that is coupled to the cartridge hub; and wherein the tape drive includes a cartridge engaging member that selectively engages the drive engaging member, a cartridge reel motor that rotates the cartridge engaging member, the drive engaging member and the cartridge hub as the magnetic tape is wound around the cartridge hub, and a resilient member that moves the cartridge engaging member so that the cartridge engaging member engages the drive engaging member.

17. The tape cartridge of claim 13 further comprising an alignment assembly that is coupled to the cartridge body, the alignment assembly including an alignment roller that is in contact with an outer surface of the magnetic tape as the magnetic tape is wound around the cartridge hub.

18. The tape cartridge of claim 17 wherein the alignment assembly further includes a resilient member that is coupled to the alignment roller, the resilient member providing a biasing force such that the alignment roller is always in contact with the outer surface of the magnetic tape as the magnetic tape is wound around the cartridge hub.

19. A tape cartridge for retaining a magnetic tape, the tape cartridge being configured to be selectively positioned substantially within a tape drive, the tape cartridge comprising:
  a cartridge body including a cartridge length from a front to a rear of the cartridge body, a cartridge width from a first side to a second side of the cartridge body, and a cartridge height from a top to a bottom of the cartridge body;
  a cartridge hub that is positioned within the cartridge body, the cartridge hub being configured so that the magnetic tape is wound around the cartridge hub within the cartridge body, the cartridge hub including a hub diameter; and
  an alignment assembly that is coupled to the cartridge body, the alignment assembly including an alignment roller and a resilient member that is coupled to the alignment roller, the resilient member providing a biasing force such that the alignment roller is always in contact with an outer surface of the magnetic tape as the magnetic tape is wound around the cartridge hub;
  wherein the cartridge length and the cartridge width provide boundaries for a maximum wound tape diameter as the magnetic tape is wound around the cartridge hub within the cartridge body;
  wherein a ratio of the maximum wound tape diameter to the hub diameter is at least approximately 4.50:1;
  wherein the magnetic tape has a tape width; and
  wherein a tape width ratio of the tape width to the cartridge height is at least approximately 0.75:1.

20. The tape cartridge of claim 19 wherein the cartridge hub is fixed in position relative to the cartridge body.

21. The tape cartridge of claim 20 further comprising a drive engaging member that is coupled to the cartridge hub; and wherein the tape drive includes a cartridge engaging member that selectively engages the drive engaging member, a cartridge reel motor that rotates the cartridge engaging member, the drive engaging member and the cartridge hub as the magnetic tape is wound around the cartridge hub, and a resilient member that moves the cartridge engaging member so that the cartridge engaging member engages the drive engaging member.

* * * * *